A. E. & J. W. BLAIR.
VEHICLE SUPPORT.
APPLICATION FILED MAR. 22, 1912.

1,042,877.

Patented Oct. 29, 1912.
2 SHEETS—SHEET 1.

Witnesses
Carroll Bailey

Inventors
Athol E. Blair.
John W. Blair.
By Victor J. Evans
Attorney

A. E. & J. W. BLAIR.
VEHICLE SUPPORT.
APPLICATION FILED MAR. 22, 1912.
1,042,877.
Patented Oct. 29, 1912.
2 SHEETS—SHEET 2.
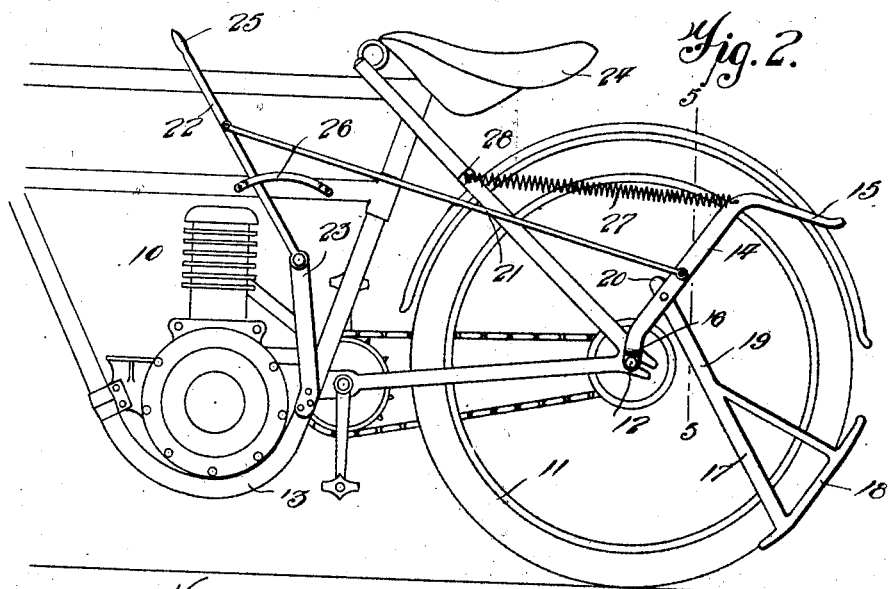
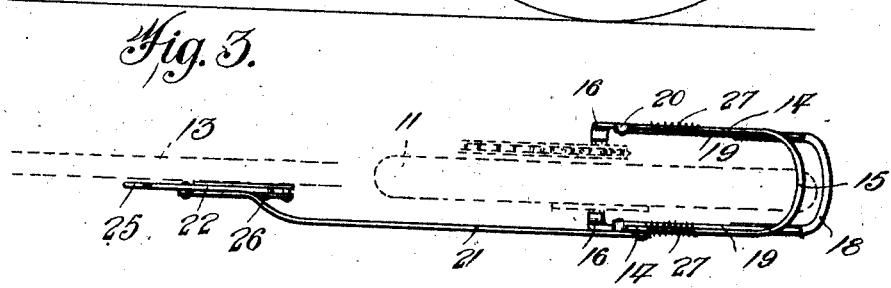
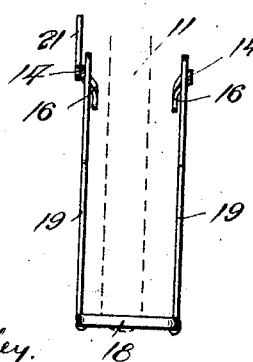
Witnesses
Carroll Bailey
Inventor
Athol E. Blair,
John W. Blair,
By Victor J. Evans
Attorney

UNITED STATES PATENT OFFICE.

ATHOL E. BLAIR AND JOHN W. BLAIR, OF VISALIA, CALIFORNIA.

VEHICLE-SUPPORT.

1,042,877. Specification of Letters Patent. Patented Oct. 29, 1912.

Application filed March 22, 1912. Serial No. 685,408.

*To all whom it may concern:*

Be it known that we, ATHOL E. BLAIR and JOHN W. BLAIR, citizens of the United States, residing at Visalia, in the county of Tulare and State of California, have invented new and useful Improvements in Vehicle-Supports, of which the following is a specification.

An object of the invention is to provide a vehicle support particularly adaptable for use in connection with motorcycles and the like to support the driving wheel of the vehicle.

The invention embodies among other features a device particularly adapted for use in connection with motorcycles and in which the operator need not leave his seat for the purpose of moving the device into supporting position, the operator being also enabled to operate the driving wheel of the vehicle when the device is in supporting position, the device being movable into non-supporting position so that the driving wheel will contact with the ground without the necessity of the driver leaving his seat.

In the operation of a large number of motorcycles, when it is desired to start the motorcycle it is necessary for the operator to pedal the motorcycle for a distance in order to properly start the engine and this operation, necessitating the movement of the entire motorcycle along the road, requires an extraordinary amount of energy and strength.

With our device, the motorcycle can be started when the motorcycle is in supported position and our support can then be swung into non-supporting position to move the driving wheel into contact with the ground, thus enabling the operator to operate the motorcycle in the usual manner, directly from the point of rest.

Figure 1:
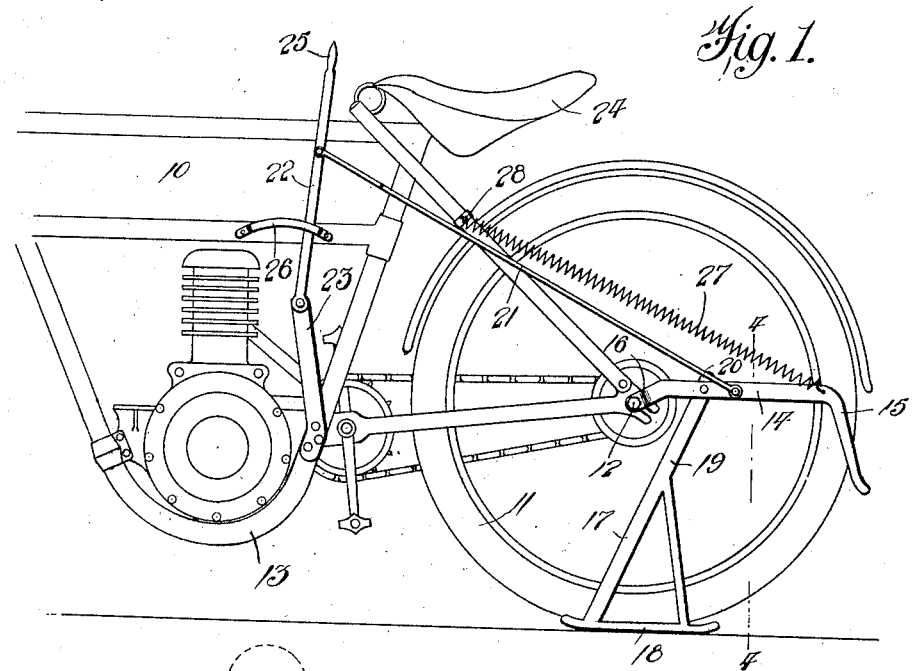
Figure 5:
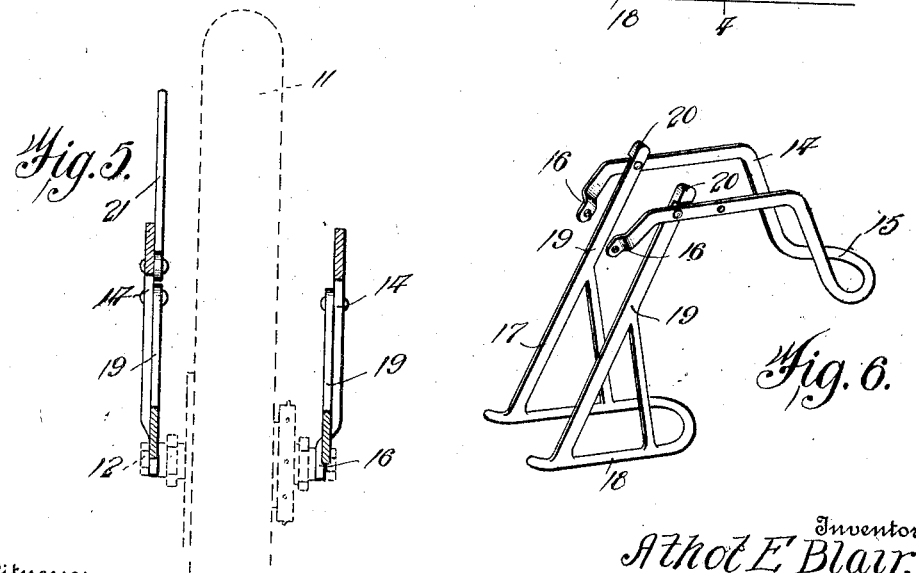
Figure 6:
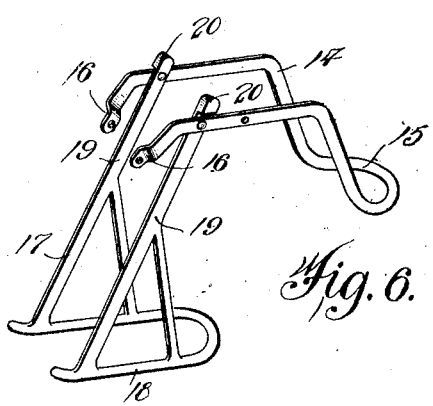

In the further disclosure of the invention, reference is to be had to the accompanying drawings constituting a part of this specification, and in which similar characters of reference denote corresponding parts in all the views, and in which:

Figure 1 is a fragmentary side elevation of a vehicle provided with our device, the same being in supporting position. Fig. 2 is a similar side elevation of a vehicle showing the device in non-supporting position; Fig. 3 is a plan view of the device, parts of the vehicle being shown in dotted lines; Fig. 4 is a fragmentary vertical sectional view of the device, taken on the line 4—4 in Fig. 1, the rear wheel of the vehicle being shown in dotted lines; Fig. 5 is a fragmentary vertical sectional view taken on the line 5—5 in Fig. 2, a portion of the rear part of the vehicle being shown in dotted lines; and Fig. 6 is a perspective view of the frame and the supporting member thereof.

Referring more particularly to the views, use is made of a vehicle 10 provided with a rear driving wheel 11, the said driving wheel being journaled upon an axle 12 mounted on the rear part of the frame 13 of the vehicle, the vehicle in this instance being a motorcycle of the usual type.

A frame 14 is mounted to swing on the ends of the axle 12 and the mentioned frame comprises, more particularly, a bar 15, bent in a U-shaped form and terminating at the ends in offset ears 16, the mentioned ears being journaled on the axle 12 with the wheel 11 of the vehicle interposed between the ends of the bar 15.

A supporting member 17 is mounted to swing on the frame 13 and comprises a base 18 having rods 19 formed therewith and extending upwardly therefrom for pivotal connection with the frame 14, the upper ends of the rods 19 being formed into integral heads 20, constituting stop flanges to limit the swinging movement of the base relative to the frame 14. Pivotally connected to the frame 14 adjacent the point of connection of the supporting member 17 with the frame 14, is a rod 21 extending forwardly to pivotally connect with an operating lever 22 mounted to swing on a bracket 23 secured to the frame 13 of the vehicle 10, the upper end of the lever 22 being arranged to lie adjacent the usual seat 24 of the vehicle and terminating in a handle 25. A guide plate 26 is secured to the frame of the vehicle and the operating lever 22 is arranged to swing between the guide plate and the frame of the vehicle. If desired, the guide plate 26 can be notched and the operating lever 22 can be provided with a tooth or flange which will receive any one of the notches of the guide plate to retain the operating lever in rigid position. A contractile spring 27 has an end thereof connected to the outer end of the frame 14, the other end of the spring being secured to a collar 28 rigidly mounted upon the frame 13 of the vehicle 10.

Assuming that our device is in non-supporting position, as shown in Fig. 2, when it is desired to move the same into supporting position, the handle 25 of the operating lever 22 is grasped and by exerting a rearward pull thereon the operating lever will be swung rearwardly, and through the medium of the rod 21 and against the action of the spring 27, will swing the frame 14 downwardly, thus swinging the supporting member 17 into supporting position to raise the rear driving wheel 11 a distance from the ground. The operator can now start the engine of the vehicle and when sufficient momentum has been imparted to the driving wheel, the operator thrusts the lever 22 forwardly, thus removing the supporting member from supporting position and permitting the driving wheel to contact with the ground and advance the vehicle, the frame 14, together with the supporting member 17, being adapted to swing upwardly by the action of the spring 27, after the supporting member 17 has been moved from supporting position, as will be readily understood by referring to the figures.

It will be seen that the heads 20 will engage the frame 14 when the frame is swung either upwardly or downwardly and the mentioned heads, constituting stop flanges, will therefore limit the swinging movement of the supporting member 17 relative to the frame, regardless of the direction in which the frame is moved by the action of the operating lever 22.

Having thus described our invention we claim:

1. In a vehicle support, the combination with a frame for pivotal connection with the frame of the vehicle, of a supporting member mounted to swing on the frame and movable therewith, heads formed on the supporting member to engage the said frame and limit the swinging movement of the supporting member relative to the frame, an operating lever mounted to swing on the frame of the vehicle, and a rod pivotally connected to the said operating lever and to the said frame for moving the said supporting member into supporting or non-supporting position.

2. In a vehicle support, the combination with a frame for pivotal connection with the frame of the vehicle, of a supporting member mounted to swing on the frame and movable therewith, heads formed on the supporting member to engage the said frame and limit the swinging movement of the supporting member relative to the frame, an operating lever mounted to swing on the frame of the vehicle, a rod pivotally connected to the said operating lever and to the said frame for moving the said supporting member into supporting or non-supporting position, and a spring connected to the said frame and to the frame of the vehicle for moving the supporting member into final, non-supporting position when the supporting member is removed from contact with the ground.

3. In a vehicle support, the combination with a U-shaped frame having offset-ears adapted for pivotal connection with the vehicle, a supporting member mounted to swing on the said frame, an operating lever mounted to swing on the frame of the vehicle, and a rod connecting the said frame with the said operating lever for moving the said supporting member into supporting or non-supporting position when the said operating lever is actuated.

4. In a vehicle support, the combination with a frame mounted to swing on the vehicle, of a supporting member mounted on the frame to swing therewith, and means for connection with the frame for moving the said supporting member into supporting or non-supporting position.

In testimony whereof we affix our signatures in presence of two witnesses.

ATHOL E. BLAIR.
JOHN W. BLAIR.

Witnesses:
 CAL. MONYHAN,
 E. D. SUTTON.